United States Patent [19]

Neuhaus et al.

[11] Patent Number: 5,028,684

[45] Date of Patent: Jul. 2, 1991

[54] PROCESS FOR THE PRODUCTION OF MOLDED POLYURETHANE BODIES

[75] Inventors: Alfred Neuhaus, Leverkusen; Otto Ganster, Odenthal; Bruno Luckas, Leverkusen, all of Fed. Rep. of Germany

[73] Assignee: Bayer Aktiengesellschaft, Leverkusen, Fed. Rep. of Germany

[21] Appl. No.: 81,958

[22] Filed: Aug. 5, 1987

[30] Foreign Application Priority Data

Oct. 28, 1986 [DE] Fed. Rep. of Germany ....... 3636604

[51] Int. Cl.$^5$ ..................... C08G 18/32; C08G 18/65
[52] U.S. Cl. ........................................ 528/77; 528/76
[58] Field of Search .................................... 528/76, 77

[56] References Cited

U.S. PATENT DOCUMENTS

| | | | |
|---|---|---|---|
| 3,306,875 | 2/1967 | Hay | 528/215 |
| 4,218,543 | 8/1980 | Weber et al. | 521/51 |
| 4,448,903 | 5/1984 | Liang et al. | 521/137 |
| 4,530,941 | 7/1985 | Turner et al. | 528/76 |
| 4,532,316 | 7/1985 | Henn | 528/76 |
| 4,549,007 | 10/1985 | Lin et al. | 528/76 |
| 4,595,705 | 6/1986 | Werner et al. | 521/51 |

FOREIGN PATENT DOCUMENTS 1209243 10/1970 Fed. Rep. of Germany .
3147736 6/1983 Fed. Rep. of Germany .

OTHER PUBLICATIONS

Hay, U.S. Pat. No. 3,306,875, Feb. 28, 1967, cols. 1, 2, 35 and 36.

Primary Examiner—John Kight, III
Assistant Examiner—Dennis R. Daley
Attorney, Agent, or Firm—Joseph C. Gil; Thomas W. Roy

[57] ABSTRACT

The present invention is directed to a process for the preparation of molded polyurethane articles having densities of about 0.8 to 1.4 g/cm$^3$ and a flex moduli according to DIN 53,457 of at least about 1800 N/mm$^2$ by reacting according to the technique of reaction injection molding (a) di- and/or polyisocyanates of the diphenylmethane series with (b) polyether polyols in the molecular weight range of 500 to 999, (c) organic polyhydroxyl compounds in the molecular weight range of 62 to 499 and optionally (d) polyethers in the molecular weight range of 1000 to about 10,000 containing at least two isocyanate reactive groups and/or (e) aromatic diamines with a molecular weight of less than 500 in the presence of (f) catalysts which accelerate the isocyanate addition reaction wherein (i) the polyether polyols used as component (b) have at least about 30% by weight of ethylene oxide units incorporated in polyether chains, (ii) component (d) is used in a quantity of 0 to about 40% by weight, based on the weight of components (b) to (e), and (iii) the nature and quantitative proportions of components (b) to (e) are chosen so that the average hydroxyl number of the mixture of these components is greater than about 300.

9 Claims, No Drawings

PROCESS FOR THE PRODUCTION OF MOLDED POLYURETHANE BODIES

BACKGROUND OF THE INVENTION

1. Field of the Invention

This invention relates to a new process for the production of molded polyurethane articles having densities of about 0.8 to 1.4 g/cm$^3$ and a flex modulus according to DIN 53,457 of at least about 1800N/mm$^2$ by the reaction of organic polyisocyanates with compounds containing isocyanate reactive groups in accordance with the reaction injection molding process.

2. Description of the Prior Art

The production of molded articles by the isocyanate polyaddition process is known in principle. Thus, for example, a process for the production of rigid polyurethane molded parts with an internal density gradient distribution is described in DE-PS No. 1,694,138. These molded parts have very good mechanical properties by virtue of their internal structure although their impact strength is not sufficient for all requirements in practice.

Although elastomeric polyurethane molded articles of the kind obtainable, for example, according to DE-OS No. 2,622,951 or DE-OS No. 3,147,736 have high impact strengths, the processes described in these publications are not suitable for the production of molded articles which have a flex modulus according to DIN 53,457 of greater than 1000N/mm$^2$.

Although molded articles with a very high flex moduli may be obtained according to DE-OS No. 3,405,679, the process disclosed in this publication requires the use of comparatively highly viscous polyester polyols which severely impairs the reliable working up of the polyol mixtures.

The underlying object of the present invention was therefore to provide a new process for the production of molded polyurethane articles by the reaction injection molding process which would not have the disadvantages of the processes known in the art and which would enable molded articles with high impact strengths to be produced with densities of about 0.8 to 1.4 g/cm$^3$ and flex moduli according to DIN 53,457 of at least about 1800N/mm$^2$.

This problem has been solved by the process according to the invention described below.

SUMMARY OF THE INVENTION

The present invention is directed to a process for the preparation of molded polyurethane articles having densities of about 0.8 to 1.4 g/cm$^3$ and a flex moduli according to DIN 53,457 of at least about 1800N/mm$^2$ by reacting according to the technique of reaction injection molding (a) di- and/or polyisocyanates of the diphenylmethane series with (b) polyether polyols in the molecular weight range of 500 to 999, (c) organic polyhydroxyl compounds in the molecular weight range of 62 to 499 and optionally (d) polyethers in the molecular weight range of 1000 to about 10,000 containing at least two isocyanate reactive groups and/or (e) aromatic diamines with a molecular weight of less than 500 in the presence of (f) catalysts which accelerate the isocyanate addition reaction wherein (i) the polyether polyols used as component (b) have at least about 30% by weight of ethylene oxide units incorporated in polyether chains, (ii) component (d) is used in a quantity of 0 to about 40% by weight, based on the weight of components (b) to (e), and (iii) the nature and quantitative proportions of components (b) to (e) are chosen so that the average hydroxyl number of the mixture of these components is greater than about 300.

DETAILED DESCRIPTION OF THE INVENTION

Starting component (a) is based on di- and/or polyisocyanates of the diphenylmethane series which are liquid at room temperature. These include the derivatives of 4,4'-diisocyanatodiphenylmethane which are liquid at room temperature, e.g. the polyisocyanates containing urethane groups obtainable according to DE-PS No. 1,618,380 by the reaction of 1 mol of 4,4'-diisocyanatodiphenylmethane and containing about 0.05 to 0.3 mol of low molecular weight diols or triols, preferably polypropylene glycols having a molecular weight below 700; and diisocyanates based on 4,4'-diisocyanatodiphenylmethane and containing carbodiimide and/or uretoimine groups, obtainable, for example, by the methods according to U.S. Pat. Nos. 3,152,162; 3,384,653 or 3,449,256; DE-OS No. 2,537,685 or EP-A-5233. Modified and unmodified mixtures of 4,4'-diisocyanatodiphenylmethane with 2,4'- and optionally 2,2'-diisocyanatodiphenylmethane which are liquid at room temperature are also suitable. Polyisocyanate mixtures of the diphenylmethane series containing the above-mentioned isomers and, in addition, their higher homologues may also be used if they are liquid at room temperature. These mixtures may be obtained in a known manner by the phosgenation of aniline/formaldehyde condensates. Modification products of these polyisocyanate mixtures containing urethane and/or carbodiimide groups are suitable as well as the reaction products of such di- and/or polyisocyanates with fatty acid esters which act as internal mold release agents, for example as described in DE-OS No. 2,319,648. Modification products of the above-mentioned di- and polyisocyanates containing allophanate or biuret groups are also suitable for use as component (a). The polyisocyanate components (a) generally have an average isocyanate functionality of about 2 to 2.6, preferably about 2.1 to 2.5.

Component (b) is based on polyether polyols or mixtures of polyether polyols having a molecular weight (average) calculated from the hydroxyl content and the functionality of 500 to 999. These polyether polyols may be obtained by the known methods of alkoxylation of suitable starter molecules such as water, ethylene glycol, propylene glycol, pentaerythritol, trimethylolpropane, glycerol, 4,4'-dihydroydiphenylpropane-(2,2), 1,4-dihydroxybenzene, ethylene diamine, 4,4'-, 2,4'- and/or 2,2'-diaminodiphenylmethane, 2,4-, 2,3- or 2,6-diaminotoluene or any mixtures of such starter molecules. The essential condition is that the polyether polyols must contain at least about 30% by weight, preferably not less than about 40% by weight of ethylene oxide units incorporated within polyether chains. These ethylene oxide units may be present both within the chain and in end positions. In addition to these ethylene oxide units, the polyether polyols (b) may contain other alkylene oxide units, in particular propylene oxide and/or butylene oxide units, but most preferably component (b) is based on polyether polyols which have been alkoxylated solely with ethylene oxide.

Component (c) is based on low molecular weight polyols in the molecular weight range of 62 to 499 which function as chain lengthening agents or crosslinking agents, e.g. ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-2,3-propanediol, dibromobutenediol (U.S. Pat. No. 3,723,392), glycerol, trimethylolpropane, hexanetriol-(1,2,6), trimethylolethane, pentaerythritol, quinitol, mannitol and sorbitol, castor oil, diethylene glycol, triethylene glycol, tetraethylene glycol, dipropylene glycol, dibutylene glycol, 1,4-bis(hydroxyethoxy)-benzene, and 2,2-bis-(4-hydroxyethoxyphenyl)-propane. The low molecular weight addition products of the above mentioned compounds with propylene oxide and/or ethylene oxide having molecular weights of at the most 499 and the low molecular weight addition products of propylene oxide and/or ethylene oxide to ammonia or amines such as ethylene diamine, 4,4'-, 2,4'- or 2,2'-diaminodiphenylmethane or 2,4-, 2,6- or 2,3-diaminotoluene are also suitable.

The optional component (d) is based on comparatively high molecular weight polyethers of the kind known in polyurethane chemistry containing at least two isocyanate reactive groups. These polyethers have a molecular weight, calculated from their functionality and functional group content, 1000 to about 10,000, preferably 1000 to about 6000. These functional groups are either primary or secondary hydroxyl groups or aliphatically or aromatically bound primary or secondary, preferably primary amino groups. The polyethers used as component (d) have a functionality (average) of 2 to 8, preferably 2 to 3 in isocyanate addition reactions, primary amino groups being counted as monofunctional groups.

Examples of suitable polyethers (d) include those obtainable in a known manner by the addition of alkylene oxides such as ethylene oxide, propylene oxide or butylene oxide to starter molecules of the type exemplified under (b) above. Relatively high molecular weight polyhydroxy-polyethers of this type containing high molecular weight polyadducts or polycondensates or polymers in a finely dispersed, dissolved or grafted form are also suitable. Modified polyhydroxyl compounds of this type may be obtained, for example, by carrying out polyaddition reactions (e.g. reactions between polyisocyanates and aminofunctional compounds) or polycondensation reactions (e.g. between formaldehyde and phenols and/or amines) in situ in the compounds containing hydroxyl groups. Processes of this kind have been described, for example, in DE-AS Nos. 1,168,075 and 1,260,142 and in DE-OS Nos. 2,324,134; 2,423,984; 2,512,385; 2,513,815; 2,550,796; 2,550,797; 2,550,833; 2,550,862; 2,633,293 and 2,639,254. Alternatively, these compounds may be obtained according to U.S. Pat. No. 3,869,413 or DE-OS No. 2,550,860 by mixing a previously prepared aqueous polymer dispersion with a polyhydroxyl compound and then removing the water from the mixture.

Polyhydroxyl compounds modified by vinyl polymers such as those obtained, for example, by the polymerization of styrene and acrylonitrile in the presence of polyethers (U.S. Pat. Nos. 3,383,351; 3,304,273; 3,523,093 and 3,110,695 and DE-AS No. 1,152,536) and polycarbonate polyols (DE-Patent No. 1,769,795, U.S. Pat. No. 3,637,909) are also suitable as component d) for the process according to the invention. Polymer products with exceptionally high flame resistance are obtained by using polyether polyols which have been modified according to DE-OS Nos. 2,442,102; 2,644,922 or 2,646,141 by graft polymerization with vinyl phosphonic acid esters and optionally (meth)acrylonitrile, (meth)acrylamide or OH-functional (meth)acrylic acid esters.

Representatives of the above-mentioned compounds which may be used as component (d) according to the invention are described, for example, in High Polymers, Vol. XVI, "Polyurethanes, Chemistry and Technology" by Saunders-Frisch, Interscience Publishers, New York, London, Volume I, 1962, pages 32 to 42 and 44 to 54 and Volume II, 1964, pages 5–6 and 198–199, and in Kunststoff Handbuch, Volume VII, Vieweg-Höchtlen, Carl-Hanser-Verlag, München, 1966, e.g. on pages 45 to 71.

Polyether amines suitable for use as component (d) may be prepared from the above-mentioned polyether polyols by known processes, for example, by the cyanoethylation of polyoxyalkylene polyols followed by hydrogenation of the resulting nitrile (U.S. Pat. No. 3,267,050) or the amination of polyoxyalkylene polyols with amines or ammonia in the presence of hydrogen and catalysts (DE-AS No. 1,215,373).

Polyether amines containing aromatically bound amino groups linked to the polyether chain by urethane or ester groups may also be used as component (d). These compounds may be prepared by methods described in EP-A-79,536; DE-OS No. 2,948,419; DE-OS No. 2,019,432; DE-OS No. 2,619,840; U.S. Pat. Nos. 3,808,250; 3,975,426 and 4,016,143.

The optional component (e) is based on aromatic diamines with molecular weights below 500. These diamines preferably have molecular weights of 108 to about 400. Examples include 1,4-diaminobenzene, 2,4-diaminotoluene and 2,4'- and/or 4,4'-diaminodiphenylmethane. Preferably the diamines have an alkyl substituent in at least one ortho-position to the amino groups. Most preferred are those which have at least one alkyl substituent in the ortho-position to the first amino group and two alkyl substituents, each with 1 to 3 carbon atoms, in the ortho-position to the second amino group, and especially those which have an ethyl, n-propyl and/or isopropyl substituent in at least one ortho-position to the amino groups and optionally methyl substituents in other ortho-positions to the amino groups. These preferred and particularly preferred diamines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene and its commercial mixtures with 1-methyl-3,5-diethyl-2,6-diaminobenzene, 4,6-dimethyl-2-ethyl-1,3-diaminobenzene, 3,5,3'5'-tetraethyl-4,4'-diaminodiphenylmethane, 3,5,3',5'-tetraisopropyl-4,4'-diaminodiphenylmethane and 3,5-diethyl-3',5'-diisopropyl-4,4'-diaminodiphenylmethane. Any mixtures of these aromatic diamines may also be used.

1-Methyl-3,5-diethyl-2,4-diaminobenzene and commercial mixtures thereof with up to about 35% by weight, based on the total mixture, of 1-methyl-3,5-diethyl-2,6-diaminobenzene (DETDA) are particularly preferred as component (e).

Suitable catalysts (f) include in particular the known tertiary amines such as triethylamine, tributylamine, N-methyl-morpholine, N-ethyl-morpholine, N-cocomorpholine, N,N,N',N'-tetramethylethylenediamine, 1,4-diazabicyclo-(2,2,2)-octane, N-methyl-N'-dimethylaminoethylpiperazine, N,N-dimethylcyclohexylamine, N,N,N',N'-tetramethyl-1,3-butanediamine, N,N-dimethylimidazole-β-phenylethylamine, 1,2-dimethylimidazole and 2-methylimidazole.

Organic metal catalysts may also be used, in particular organic tin catalysts, e.g. tin-(II) salts of carboxylic acids such as tin-(II)-acetate, tin(II)-octoate, tin-(II)-ethylhexoate and tin-(II)-laurate and the dialkyl tin salts of carboxylic acids such as dibutyl tin diacetate, dibutyl tin dilaurate, dibutyl tin maleate or dioctyl tin diacetate. These catalysts may be used alone or in combination with the tertiary amines. Other examples of catalysts and details concerning the mechanisms of the catalysts are given in Kunststoff Handbuch, Volume VII, published by Vieweg and Höchtlen, Carl-Hanser-Verlag, Münich 1966, e.g. on pages 96 to 102.

The catalysts or catalyst combinations are preferably used in quantities of about 0.01 to 5% by weight, in particular about 0.05 to 2% by weight of catalyst or catalyst combination, based on the sum of the weight of components (b) to (g).

The optional auxiliary agents and additives (g) include blowing agents, surface-active substances, foam stabilizers and internal mold release agents.

Examples of suitable blowing agents include water, methylene chloride, monofluorotrichloromethane, dichlorodifluoromethane, chlorodifluoromethane and inert gases such as nitrogen, air or carbon dioxide. When such inert gases are used, the reaction mixture is "charged" with gas by incorporating the gas in a quantity (based on normal pressure) of at least 10 vol %, preferably at least 20 vol %, based on the mixture of components (b) to (e), by means of a Venturi meter or a hollow stirrer (according to DE-OS No. 3,244,037).

Compounds which assist the homogenization of the starting materials serve as surface-active substances. Examples include the sodium salts of fatty acids and the salts of fatty acids with amines e.g. oleic acid diethylamine or stearic acid diethanolamine.

The foam stabilizers used are mainly water-soluble polyether siloxanes. The structure of these compounds is generally based on a copolymer of ethylene oxide and propylene oxide with a polydimethylsiloxane group attached thereto. Foam stabilizers of this kind have been described, for example, in U.S. Pat. No. 2,764,565.

The quantity of blowing agents, surface active substances and foam stabilizers, if used, is generally less than about 15% by weight, preferably not more than about 10% by weight, based on the total weight of components (a) to (g).

The optional auxiliary agents (g) also include known internal mold release agents such as those described, for example, in DE-OS No. 1,953,637 (=U.S. Pat. No. 3,726,952), DE-OS No. 2,121,670 (=GB-P No. 1,365,215), DE-OS No. 2,431,968 (U.S. Pat. No. 4,098,731) or DE-OS No. 2,404,310 (=U.S. Pat. No. 4,058,492). The following are preferred mold release agents: fatty acid salts containing at least 25 aliphatic carbon atoms obtained from fatty acids containing at least 12 aliphatic carbon atoms and primary mono-, di- or polyamines containing two or more carbon atoms or amines which have amide or ester groups and contain at least one primary, secondary or tertiary amino group; saturated and/or unsaturated esters containing COOH groups and/or OH groups and obtained from mono- and/or polyfunctional carboxylic acids and polyfunctional alcohols having hydroxyl or acid numbers of at least 5; ester type reaction products of ricinoleic acid and long chained fatty acids; salts of carboxylic acids and tertiary amines; and natural and/or synthetic oils, fats or waxes.

The oleic acid or tall oil fatty acid salt of an amine containing amide groups obtained by the reaction of N-dimethylaminopropylamine with oleic acid or tall oil fatty acid and the salt of 2 mols of oleic acid and 1 mol of 1,4-diaza-bicyclo-(2,2,2)-octane are particularly preferred.

Apart from these exemplified preferred mold release agents, other mold release agents known in the art may in principle also be used in the process according to the invention, either alone or together with the preferred mold release agents exemplified above. These other suitable mold release agents include the reaction products of fatty acid esters and polyisocyanates according to DE-AS No. 2,307,589; the reaction products of polysiloxanes containing reactive hydrogen atoms and mono- and/or polyisocyanates according to DE-OS No. 2,356,692 (U.S. Pat. No. 4,033,912), esters of polysiloxanes containing hydroxymethyl groups and mono- and/or polycarboxylic acids according to DE-OS No. 2,363,452 (=U.S. Pat. No. 4,024,090); and salts of polysiloxanes containing amino groups and fatty acids according to DE-OS No. 2,427,273 or DE-OS No. 2,431,968 (U.S. Pat. No. 4,098,731).

When such internal mold release agents are used, they are put into the process in a total quantity of up to 15% by weight, preferably not more than 10% by weight, based on the total reaction mixture.

Other optional additives (g) include fillers, dyes, pigments and flame retardants.

The following are examples of fillers, in particular reinforcing fillers: silicate minerals, e.g. lamellar silicates such as antigorite, serpentine, horn blende, amphibile, chrisotile, and talc; metal oxides such as kaolin, aluminum oxides, titanium oxides and iron oxides; metal salts such as chalk and heavy spar; inorganic pigments such as cadmium sulphide or zinc sulphide; glass; powdered asbestos, etc. It is preferred to use natural and synthetic fibrous minerals such as asbestos, wollastonite and especially glass fibres of various lengths, optionally treated with size.

Fillers may be used singly or as mixtures. If fillers are used, they are advantageously added to the reaction mixture in quantities of up to about 50% by weight, preferably up to about 30% by weight, based on the weight of components (b) to (g).

Tricresylphosphate, tris-2-chloroethylphosphate, tris-chloropropylphosphate and tris-2,3-dibromopropylphosphate are examples of suitable flame retardants.

Inorganic flame retardants such as aluminum hydroxide, aluminum polyphosphate or calcium sulphate may be used in addition to the halogenated phosphates mentioned above. It has generally been found advantageous to use up to about 25% by weight of the aforesaid flame retardants, based on the sum of components (b) to (g).

The optional "additives" (g) also include monohydric alcohols such as butanol, 2-ethylhexanol, octanol, dodecanol or cyclohexanol which may serve to bring about chain breaking as required, but the reaction mixtures generally do not contain such monohydric alcohols.

Further details concerning conventional auxiliary agents and additives may be found in the technical literature, for example the monograph by J. H. Saunders and K. C. Frisch entitled "High Polymers" Volume XVI, Polyurethanes, Part 2, Interscience Publishers, 1962 and 1964.

The process according to the invention may be carried out by mixing components (b) to (e) to form a "polyol component" which is then worked up together with polyisocyanate component (a) by the reaction injection molding technique. The catalysts (f) and auxiliary agents and additives (g), if used, are generally added to the "polyol component" or to one or more of components (b) to (e) prior to preparation of the polyol component although this procedure is not essential since catalysts and auxiliary agents and additives may also be incorporated with polyisocyanate component (a) if they are compatible with this component.

For the preparation of the "polyol component" from the various components (b) to (e), the nature and quantitative proportions of these individual components are chosen so that (i) the portion of component (b), based on the total weight of components (b) to (e), amounts to at least about 10% by weight, preferably at least about 20% by weight, (ii) the proportion of component (c), based on the total weight of components (b) to (e), amounts to about 10 to 60% by weight, preferably about 20 to 40% by weight, (iii) the proportion of the optional component (d), based on the total weight of components (b) to (e), is up to about 40% by weight, preferably up to about 25% by weight, (iv) the quantity of the optional component (e), based on the total weight of components (b) to (e), is at most about 10% by weight, and (v) the mean hydroxyl number of the "polyol component" is greater than about 300, preferably greater than about 400 mg KOH/g.

If component (d) and/or (e) contains primary and/or secondary amino groups, then the aforesaid "hydroxyl number" includes the "amine number" or "NH number" of these components. This amine number of NH number may also be determined by titration like the true hydroxyl number and is also given in mg KOH/g and is therefore equivalent to the true hydroxyl number and exchangeable with this number.

Furthermore, care should be taken that before the process according to the invention is carried out, either component (a) and/or the "polyol component" composed of components (b) to (e) has some degree of branching since it is not preferred to use exclusively difunctional starting materials. Thus, when difunctional polyisocyanates are used, i.e. when component (a) is based on diisocyanates, the mean functionality of the "polyol component" should be at least about 2.30. Conversely, when components (b) to (e) consist exclusively of difunctional compounds, the polyisocyanate component should have an isocyanate functionality of at least about 2.30. On the basis of an isocyanate index of 100, the mean functionality of all the starting components, i.e. the arithmetic mean of the functionality of component (a) and of the mean functionality of the "polyol component" should be at least about 2.15.

In the process according to the invention the quantitative proportions of the reaction components are calculated to provide a reaction mixture having an isocyanate index of about 70 to 130, preferably about 90 to 110. By "isocyanate index" is meant the quotient of the number of isocyanate groups and the number of isocyanate reactive groups multiplied by 100.

The mixture obtained by mixing the components together is introduced into the mold. The quantity of blowing agent, if used, and the quantity of mixture introduced into the mold are generally calculated to provide to a molded article having a density of about 0.8 to 1.4 g/cm$^3$, preferably about 0.9 to 1.2 and in particular about 1.0 to 1.18 g/cm$^3$. Molded articles having a density greater than 1.2 g/cm$^3$ may be produced, in particular when mineral fillers are used. The molded articles obtainable according to this invention are generally microcellular plastics although solid molded products may also be obtained if the mold is completely filled, especially if no blowing agents and/or inert gases such as air are used. The products may generally be removed from the mold after a molding time of about 30 to 180 seconds, preferably about 60 to 90 seconds.

The initial temperature of the mixture introduced into the mold is generally chosen to lie in the range of about 20° to 80° C., preferably about 30° to 50° C. The temperature of the mold is generally about 40° to 100° C., preferably about 50° to 70° C.

The process according to this invention is suitable in particular for the production of high quality rigid molded articles with high impact strength, e.g. housings or parts of apparatus used for technical purposes.

The invention is further illustrated, but is not intended to be limited by the following examples in which all parts and percentages are by weight unless otherwise specified.

EXAMPLES

The components used in Examples I to IV were processed by the reaction injection molding process (RIM). Components (b) to (e) containing isocyanate reactive groups were first combined with the auxiliary agents and additives to form a "polyol component" which was then worked up with polyisocyanate component (a) in sufficient quantity to provide isocyanate index of 110. For this purpose, the reactive components, which were maintained at a temperature of 30° C., were introduced into a high pressure apparatus and after being vigorously mixed in a force controlled mixing head, were forced under pressure into the metal mold.

The mold, a sheet mold of aluminum which was at a temperature of 60° C. before being filled and had been coated with an external mold release agent (Acmosil 180 of Acmos Chem. Fabrik, Post Box 101069, D-2800 Bremen 1) on its internal walls was designed to produce molded parts having the following dimensions:

| | |
|---|---|
| Length | 1000 mm |
| Width | 500 mm |
| Thickness | 4 mm |
| Sprue | choker bar |

STARTING MATERIALS

Polyisocyanate component (a):

Polyisocyanate mixture of the diphenylmethane series prepared by the phosgenation of an aniline/formaldehyde condensate.
Isocyanate content 31%,
mean isocyanate functionality 2.4, viscosity (25° C.) 130 mPa.s.

Component (b):
Ethoxylation product of trimethylolpropane.
Molecular weight 672, functionality 3.

Component (c1):
Propoxylation product of trimethylolpropane.
Molecular weight 165, functionality 3.

Component (c2):
Propoxylation product of ethylene diamine.
Molecular weight 280, functionality 4.

Component (d):
Polyether polyol prepared by the alkoxylation of trimethylolpropane with a mixture of propylene oxide and ethylene oxide in a molar ratio of 75:15 followed by propoxylation of the alkoxylation product with 10 mol-% of propylene oxide, based on the total number of mols of alkylene oxides used.
Molecular weight 3660, functionality 3.

Component (e):
Mixture of 30% of 1-methyl-3,5-diethyl-2,6-diaminobenzene and 70% of 1-methyl-3,5-diethyl-2,4-diaminobenzene.
NH number 630.

Component (f1):
Triethylenediamine.

Component (f2):
Dimethyl tin (IV) dilaurate.

Component (g):
Reaction product of 2 mol of tall oil and 1 mol of N,N-dimethylamino-propylamine according to DE-OS No. 1,953,637 (acts as emulsifier and internal mold release agent).

| Formulation | Dimension | I | II | III | IV | V |
|---|---|---|---|---|---|---|
| Component (b) | Parts by wt. | 69.73 | 59.78 | 69.94 | 26.32 | — |
| Component (c1) | " | 19.92 | 29.87 | — | 25.70 | 36.34 |
| Component (c2) | " | — | — | 29.54 | 10.00 | — |
| Component (d) MW 3660 | " | — | — | — | 25.6 | 53.27 |
| Component (e) | " | 9.97 | 9.97 | — | 5.00 | 9.96 |
| Component (f1) | " | 0.33 | 0.33 | 0.33 | 0.33 | 0.33 |
| Component (f2) | " | 0.05 | 0.05 | 0.19 | 0.05 | 0.10 |
| Component (g) | " | — | — | — | 7.00 | — |
| OH number* | | 442 | 520 | 408 | 453 | 461 |
| Component (a) | Parts by wt. | 117 | 138 | 108 | 120 | 123 |
| NKS Impact strength DIN 53453 | kJ/m$^2$ | 59 | 42 | 86 | 46 | 49 |
| NKS Notched bar impact strength DIN 53453 | kJ/m$^2$ | 8.5 | 6.9 | 9.3 | 7.0 | 7.4 |
| Flex Modulus DIN 53457 | N/mm$^2$ | 2276 | 2270 | 2100 | 2000 | 1600 |

*Mean OH number of components (b) to (e)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded polyurethane article having a density of about 0.8 to 1.4 g/cm$^3$ and a flex modulus according to DIN 53,457 of at least about 1800N/mm$^2$ by reacting according to the reaction injection molding process at an isocyanate index of 70 to 130 a mixture comprising (a) a di- and/or polyisocyanate of the diphenylmethane series with
    (b) at least 20% by weight, based on the total weight of the isocyanate reactive components, of a polyether polyol in the molecular weight range of 500 to 999 and
    (c) 10 to 60% by weight, based on the total weight of the isocyanate reactive components, of an organic polyhydroxyl compound in the molecular weight range of 62 to 499 which comprises a member selected from the group consisting of (i) glycerol, trimethylolpropane, hexanetriol-(1,2,6), trimethylolethane, pentaerythritol, quinitol, mannitol, sorbitol, castor oil, (ii) propoxylation products, ethoxylation products and propoxylation and ethoxylation products of the compounds set forth under (i), (iii) propoxylation products, ethoxylation products and propoxylation and ethoxylation products ammonia and (iv) propoxylation products, ethoxylation products and propoxylation and ethoxylation products of amines, in the presence of a catalyst which accelerates the isocyanate addition reaction, wherein
    (i) the polyether polyol used as component (b) contains at least 30% by weight of ethylene oxide units incorporated in polyether chains and
    (ii) the nature and quantitative proportions of the isocyanate reactive components are otherwise so chosen that the mean hydroxyl number of the mixture of these components is greater than 300.

2. The process of claim 1 wherein the mixture of isocyanate reactive components additionally contains a positive amount of up to 40% by weight of a polyether (d) having a molecular weight of 1000 to about 10,000 and containing at least two isocyanate reactive groups.

3. The process of claim 1 wherein the mixture of isocyanate reactive components contains an aromatic diamine (e) having a molecular weight below 500.

4. The process of claim 3 wherein the mixture of isocyanate reactive components contains an aromatic diamine (e) having a molecular weight below 500.

5. The process of claim 3 wherein said aromatic diamine (e) is present in a positive amount of at most about 10% by weight, based on the total weight of the isocyanate reactive components.

6. The process of claim 4 wherein said aromatic diamine (e) is present in a positive amount of at most about 10% by weight, based on the total weight of the isocyanate reactive components.

7. A process for the production of a molded polyurethane article having a density of about 0.8 to 1.4 g/cm$^3$ and a flex modulus according to DIN 53,457 of at least about 1800N/mm² by reacting according to the reaction injection molding process at an isocyanate index of 70 to 130 a mixture comprising (a) a di- and/or polyisocyanate of the diphenylmethane series with (b) at least 20% by weight, based on the total weight of the isocyanate reactive components, of a polyether polyol in the molecular weight range of 500 to 999, (c) 10 to 60% by weight, based on the total weight of the isocyanate reactive components, of an organic polyhydroxyl compound in the molecular weight range of 62 to 499 which comprises a member selected from the group consisting of (i) glycerol, trimethylolpropane, hexanetriol-(1,2,6), trimethylolethane, pentaerythritol, quinitol, mannitol, sorbitol, castor oil, (ii) propoxylation products, ethoxylation products and propoxylation and ethoxylation products of the compounds set forth under (i), (iii) propoxylation products, ethoxylation products and propoxylation and ethoxylation products ammonia and (iv) propoxylation products, ethoxylation products and propoxylation and ethoxylation products of amines and (d) a positive amount of up to 40% by weight, based on the total weight of the isocyanate reactive components of a polyether having a molecular weight of 1000 to about 10,000 and containing at least two isocyanate reactive groups, in the presence of a catalyst which accelerates the isocyanate addition reaction, wherein (i) the polyether polyol used as component (b) contains at least 30% by weight of ethylene oxide units incorporated in polyether chains and (ii) the nature and quantitative proportions of the isocyanate reactive components are otherwise so chosen that the mean hydroxyl number of the mixture of these components is greater than 400.

8. The process of claim 7 wherein the mixture of isocyanate reactive components contains an aromatic diamine having a molecular weight below 500.

9. The process of claim 8 wherein said aromatic diamine (e) is present in a positive amount of at most about 10% by weight, based on the total weight of the isocyanate reactive components.

* * * * *